United States Patent
Ritter

[15] 3,696,585
[45] Oct. 10, 1972

[54] FISH BAIT CONTAINER AND WRAPPING DEVICE

[72] Inventor: Charles P. Ritter, 704 East Prairie Road, Dowagiac, Mich. 49047

[22] Filed: Oct. 23, 1970

[21] Appl. No.: 83,386

[52] U.S. Cl. .................................................. 53/390
[51] Int. Cl. ............................................. B65b 67/08
[58] Field of Search ............................... 53/390, 393

[56] References Cited

UNITED STATES PATENTS 3,175,338  3/1965  Ahlgren et al. ............... 53/390

*Primary Examiner*—Travis S. McGehee
*Attorney*—Hobb & Green and Kemon, Palmer & Estabrook

[57] ABSTRACT

A fish bait container and wrapping device for forming a parcel of bait enclosed in fabric, in which a slidable part is disposed in a frame-like member, the member and part having two opposed slots, which together form a hole through which the fabric may be pushed to form a bag-like structure. In one position of the sliding part, the hole is substantially round, and in another position of the sliding part, the hole is restricted to clamp and hold the bag-like structure. The pieces of bait are inserted in the bag-like structure after it has been formed, and the bag is tied while it is held between the sliding part and the frame-like members. The wrapping mechanism may form a lid on a container for the bait, and the container has a means for securing the device to the leg of a fisherman.

8 Claims, 7 Drawing Figures

PATENTED OCT 10 1972

INVENTOR.
CHARLES P. RITTER
BY Hobbs & Green
ATTORNEYS

PATENTED OCT 10 1972

INVENTOR.
CHARLES P. RITTER
BY Hobbs & Green
ATTORNEYS

FISH BAIT CONTAINER AND WRAPPING DEVICE

Some types of fish bait consist of small pieces or material too soft to be held by the hook. In the past the pieces and material have been wrapped in loosely woven cloth or thin netting which is then secured to the hook. This practice, however, has been difficult and wasteful, in that the small pieces and material are not easily handled and tied in the cloth or netting while fishing and often while the hands are wet and/or cold. Further, shaping the cloth and netting into a bag-like structure for retaining the material results in various sized parcels. This has been unsatisfactory in that some are too small to be effective bait and others are so large as to be wasteful. It is therefore one of the principal objects of the present invention to provide a device which serves as a container for the small and soft pieces of bait and which functions as a holder for the cloth or netting to permit the pieces to be easily inserted in a preshaped bag-like structure formed in the device.

Another object of the invention is to provide a fish bait container and wrapping device which assists in forming bag-like structures of consistent size and shape for receiving the pieces of bait, and which holds the filled structures in a firm and closed position while they are being tied.

Still another object of the invention is to provide a bait container and wrapping device which is compact, easily handled and carried, and which can be secured to the fisherman's leg above the knee so that the bait can be easily reached and the wrapping means easily manipulated while the fisherman is sitting and fishing in a comfortable position.

A further object is to provide a device of the aforesaid type which includes an attachment for removably holding the device on the fisherman's leg or other supporting structure, and from which the attachment can be easily removed when the device is not in use and is to be carried or stored.

Another object of the invention is to provide a bait container having a lid pivotally attached thereto, which includes a mechanism for assisting in forming a parcel from cloth and netting and for holding the parcel while it is being filled with bait material and tied, and which can be operated quickly and efficiently with little experience or supervision.

Additional objects and advantages of the invention will become apparent from the following description and accompanying drawings, wherein.

Figure 7:
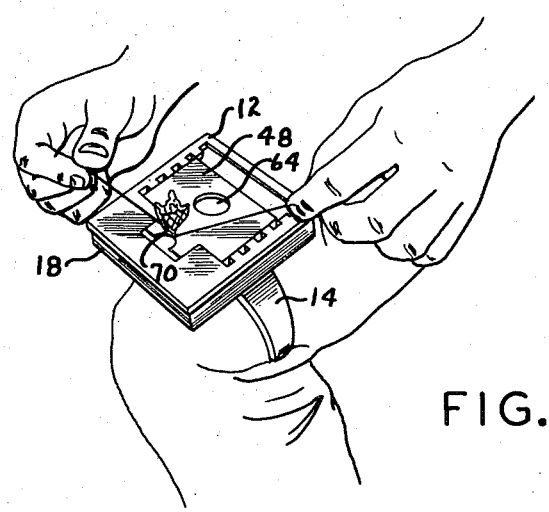
FIG. 7 is a small perspective view of the device showing the manner in which the device is held and used.

Referring more specifically to the drawings, numeral 10 indicates generally the present fish bait container and wrapping device, 12 the container and wrapping portion, and 14 a clip used for retaining the device in position while it is being used. The manner in which it is used is illustrated in FIG. 7, in which the device is shown clipped to the leg of the fisherman, and the bait is being prepared in the device. The present device is used primarily for retaining small pieces of bait or bait material too soft to be held by the hook. This material is normally enclosed in a cloth of light netting-type material to form a parcel about the size of a marble. The cloth or netting is tied to hold the pieces or material in the bag, and the bag is used by securing it to a fish hook or other fish catching means. The particular type of cloth or netting may be of various weaves and mesh size, and a string or thread of any suitable size may be used to tie the parcel after the bait pieces or material have been inserted in the bag-like structure.

The container section 18 shown in the drawings is constructed of four sides, 20, 22, 24, and 26 and a bottom 28 secured integrally together to form a rectangular box-like structure. A lid 30 is pivotally secured to wall 26 by hinges 32 and 34, both the container, lid and hinges preferably being formed of a plastic material. The container is relatively small, since normally the fisherman requires only a small amount of the bait pieces or material for a fishing trip, the approximate size being indicated by the view in FIG. 7. While the container is shown as rectangular, it may be round or of any other suitable shape.

Figure 1:
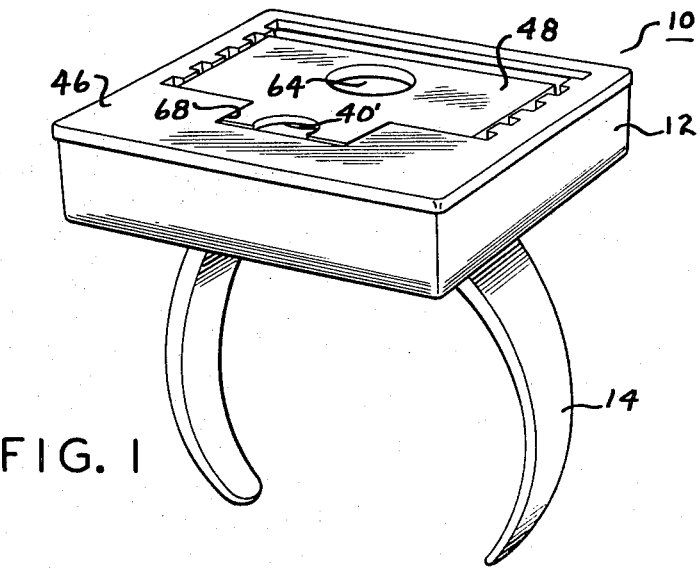
FIG. 1 is a perspective view of the present fish bait container.
Figure 2:
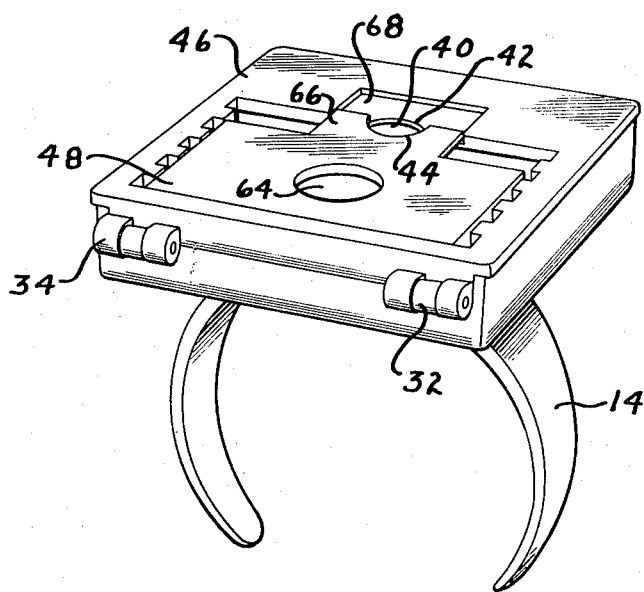
FIG. 2 is another perspective view of the present device, showing the side and end opposite those shown in FIG. 1.
Figure 4:
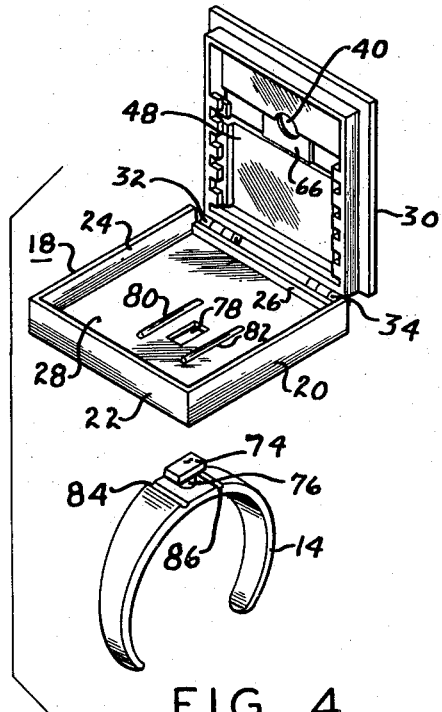
FIG. 4 is an exploded perspective view of two principal parts of the device.

In the embodiment illustrated in the drawings, the lid contains the mechanism for forming and holding the bag-like structure for the parcel of bait pieces or material. This mechanism has an opening 40 formed by semicircular openings 42 and 44 in the principal part or frame 46 of the lid and in sliding part or door 48, respectively. The sliding door 48 has flanges 50 and 52 on opposite edges thereof which seat in slots 54 and 56 formed by a plurality of projections 58 and 60 above and below the two flanges along the respective sides of a rectangular opening 62 in the lid. The door is slid between the positions illustrated in FIGS. 1 and 2 by inserting a finger in hole 64 in the center of the door and pushing in the desired direction. Opening 44 is disposed in a projection 66 in the edge of the door, and the projection slides in a rectangular slot 68 in the upper surface of the lid. When the door is in the position shown in FIG. 2, the hole 40 is substantially round, and when the door is in the position shown in FIG. 1, hole 40 is merely an elongated, narrow slot indicated by numeral 40'. While the bag forming and holding mechanism is shown mounted in the lid of the device, the mechanism may be used separately or in combination with other types of structures.

Both hands are normally required to form and tie the bait parcel indicated by numeral 70, and it is usually necessary to hold the container in a firm position for the most efficient operation. In the embodiment of the invention illustrated in the drawings, the container is held on the leg of the fisherman by clip 14 which is removably secured to the bottom of the container. The clip is generally arcuate shaped and is constructed of a resilient plastic, such that the opening between the two prongs of the clip can be spread and snapped around the fisherman's leg, preferably immediately above the knee. In order to permit the device to be folded into a compact form for transporting and storing, the clip is removably secured to the bottom of the container. The securing means shown in the drawings consists of a lug 74 supported by a neck 76 formed integrally with lug 74 and a portion of the clip. The lug is generally rectanguler in shape and in direction for slipping through an elongated hole 78 in bottom 28 of the container. When the lug has been inserted through hole 78, the clip is turned, causing the ends of the lug to overlap the adjacent portion of the bottom, thereby retaining the clip firmly in place on the underside of the bottom. In order to hold the clip and container in properly oriented assembled position, two ribs on the underside of the bottom corresponding to grooves 80 and 82, seat in slots 84 and 86 respectively, when the clip is turned to its locked position extending transversely across the bottom of the container. The clip will remain in its secured position until the container is intentionally removed therefrom, the removal being facilitated by pressing the prongs of the clip inwardly, thereby assisting in disengaging the ribs from the grooves 84 and 86.

Figure 3:
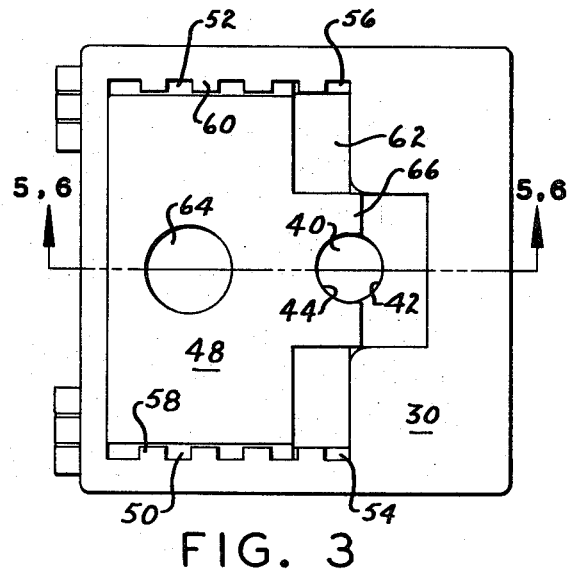
FIG. 3 is a top plan view of the device.
Figure 5:
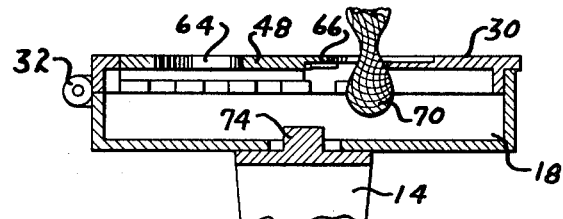
FIG. 5 is a vertical cross sectional view taken on line 5—5 of FIG. 3, showing one operating position of the device.
Figure 6:
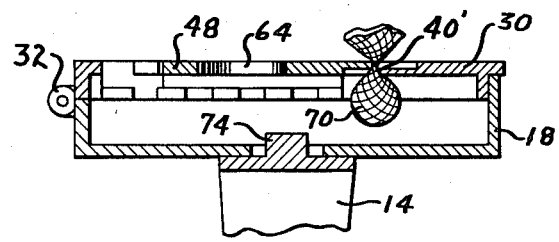
FIG. 6 is a vertical cross sectional view similar to that shown in FIG. 5, showing another operating position of the device.

In the use of the present fish bait container and wrapping device, the bait pieces and material are placed in container 18 and the lid is closed. When the device is to be used to form a bait parcel, the clip 14 is connected to the bottom of the container by inserting lug 74 through opening 78 and then turning the clip 90° to seat the ribs on the bottom of the container in grooves 84 and 86. The device is then mounted on the fisherman's leg immediately above the knee in the manner illustrated in FIG. 7. A small piece of cloth or thin netting for forming the parcel is then pressed downwardly through hole 40 with one finger while door 48 is in its retracted position illustrated in FIGS. 2, 3, and 5. As the material is pressed through the hole, a bag-like structure having an opening at the top is formed. The bait material is then removed from the container and placed in the bag structure and door 48 is moved to the position to substantially close the hole 40, i.e., to the position illustrated at numeral 40' in FIGS. 1 and 6. This restricts the opening of the bag and holds the bag firmly in position while the fisherman ties a thread or string around the closed bag immediately above the upper surface of the door. After the bag has been tied and the parcel thereby formed, the door is moved to its retracted position illustrated in FIGS. 2, 3, and 5, and the completed parcel is then removed from the hole ready for use as bait.

It is seen that the bait can easily be formed by the fisherman while sitting in a boat or on a dock with his hands free to form the bag-like structure and to tie the structure after the bait has been inserted therein. When the fisherman is through fishing, the device is removed from the leg and the clip removed from the bottom of the container in the manner previously described herein by rotating the clip 90° and removing lug 74 from hole 78, preferably while pressing the prongs of the clip inwardly to assist in disengaging the ribs on the bottom from grooves 84 and 86.

While only one embodiment of the present fish bait and wrapping device has been described in detail herein, various changes and modifications may be made without departing from the scope of the invention.

I claim:

1. A fish bait container and wrapping device for forming a parcel of bait enclosed in fabric, comprising a container for bait and a lid for said container, said lid having a frame member, and a sliding member in said frame member, said members together defining a hole through said lid for forming a bag-like structure from a piece of fabric, said hole being relatively large when said sliding member is in one position for forming said bag-like structure and restricted when said sliding member is in another position for closing and holding said bag-like structure.

2. A fish bait container and wrapping device as defined in claim 1 in which said lid is pivotally connected to said container.

3. A fish bait container and wrapping device as defined in claim 1 in which said container and lid are rectangular in shape.

4. A fish bait container and wrapping device as defined in claim 1 in which said sliding member is disposed in an opening in said lid and is provided with track-like members on each edge to permit sliding between the two positions of the hole.

5. A fish bait container and wrapping device as defined in claim 1 in which said frame member extends around said sliding member and is an integral part of said lid.

6. A fish bait container and wrapping device as defined in claim 4 in which said frame member extends around said sliding member and is an integral part of said lid.

7. A fish bait container and wrapping device as defined in claim 1 in which a clip is removably secured to the underside of said container for retaining said device on a portion of the body of the fisherman.

8. A fish bait container and wrapping device as defined in claim 7 in which said clip consists of an arcuate member having two prong-like portions and a lug in the center thereof extends through a hole in the bottom of the container for attaching said clip to the container.

* * * * *